United States Patent
Keller et al.

(10) Patent No.: US 11,459,102 B2
(45) Date of Patent: *Oct. 4, 2022

(54) CONTAINER RETENTION AND RELEASE APPARATUS HAVING INTEGRAL SWAYBRACE AND RETENTION FEATURES

(71) Applicant: The Boeing Company, Chicago, IL (US)

(72) Inventors: Cory Gordon Keller, St. Charles, MO (US); James V. Eveker, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 798 days.

This patent is subject to a terminal disclaimer.

(21) Appl. No.: 16/200,267

(22) Filed: Nov. 26, 2018

(65) Prior Publication Data

US 2020/0164983 A1     May 28, 2020

(51) Int. Cl.
*B64D 1/04*     (2006.01)
*B64D 1/02*     (2006.01)
*F16B 9/00*     (2006.01)

(52) U.S. Cl.
CPC . *B64D 1/02* (2013.01); *F16B 9/09* (2018.08)

(58) Field of Classification Search
CPC ... B64D 1/00; B64D 1/02; B64D 1/04; B64D 1/06; B64D 7/08
USPC ............................... 89/1.53, 1.54, 1.58, 1.59
See application file for complete search history.

(56) References Cited

U.S. PATENT DOCUMENTS

| | | | |
|---|---|---|---|
| 2,386,680 A | 10/1945 | Grotke | |
| 2,413,635 A | 12/1946 | Lee | |
| 2,478,019 A | 8/1949 | Sonntag | |
| 2,877,688 A | 3/1959 | Markil | |
| 2,941,442 A | 6/1960 | Buschers | |
| 2,978,211 A | 4/1961 | Wannlund et al. | |
| 3,181,908 A | 5/1965 | Clark | |
| 3,242,808 A * | 3/1966 | Pault | B64D 1/04 89/1.51 |
| 3,268,188 A | 8/1966 | La Roe et al. | |
| 3,367,233 A | 2/1968 | Silverschotz | |
| 3,670,620 A * | 6/1972 | Paraskewik | B64D 1/04 89/1.53 |
| 3,787,012 A | 1/1974 | Jakubowski, Jr. | |

(Continued)

FOREIGN PATENT DOCUMENTS

GB      784053      10/1957

OTHER PUBLICATIONS

United States Patent and Trademark Office, "Ex Parte Quayle Action," issued in connection with U.S. Appl. No. 16/200,211, dated May 12, 2020, 5 pages.

(Continued)

*Primary Examiner* — Christopher D Hutchens
*Assistant Examiner* — Michael A. Fabula
(74) *Attorney, Agent, or Firm* — Hanley, Flight & Zimmerman, LLC

(57) ABSTRACT

A container retention and release apparatus includes an actuator a swaybrace and retention assembly pivotally coupled to the actuator. The swaybrace and retention assembly pivot relative to the actuator between a first position to retain a container and a second position to release the container.

20 Claims, 13 Drawing Sheets

(56) References Cited

U.S. PATENT DOCUMENTS

| | | | |
|---|---|---|---|
| 3,877,343 A * | 4/1975 | Newell | F41F 5/00 |
| | | | 89/1.51 |
| 3,887,150 A | 6/1975 | Jakubowski, Jr. | |
| 4,120,232 A | 10/1978 | Hoffman, Jr. | |
| 4,122,754 A * | 10/1978 | Panlaqui | B64D 7/08 |
| | | | 244/137.4 |
| 4,132,147 A | 1/1979 | Contaldo | |
| 4,168,047 A | 9/1979 | Hasquenoph et al. | |
| 4,187,760 A | 2/1980 | Holt | |
| 4,196,879 A * | 4/1980 | Craigie | B64D 7/08 |
| | | | 244/137.4 |
| 4,202,576 A | 5/1980 | Hasquenoph et al. | |
| 4,204,456 A * | 5/1980 | Ward | B64D 7/08 |
| | | | 294/205 |
| 4,257,639 A | 3/1981 | Stock | |
| 4,318,561 A | 3/1982 | Hasquenoph et al. | |
| 4,407,180 A * | 10/1983 | Regnat | B64D 1/06 |
| | | | 89/1.53 |
| 4,441,674 A | 4/1984 | Holtrop | |
| 4,620,680 A * | 11/1986 | Hasquenoph | B64D 7/08 |
| | | | 244/137.4 |
| 4,732,074 A * | 3/1988 | Normand | B64D 1/06 |
| | | | 89/1.51 |
| 4,850,533 A | 7/1989 | Hoshi et al. | |
| 4,850,553 A | 7/1989 | Takata et al. | |
| 5,052,639 A * | 10/1991 | Lemacon | B64D 1/06 |
| | | | 244/137.4 |
| 5,335,881 A | 8/1994 | Zaguli | |
| 5,406,876 A | 4/1995 | Harless et al. | |
| 5,484,243 A | 1/1996 | Yacobovitch | |
| 5,904,323 A | 5/1999 | Jakubowski, Jr. et al. | |
| 6,811,123 B1 * | 11/2004 | Foster | F15B 1/024 |
| | | | 244/137.4 |
| 7,083,148 B2 | 8/2006 | Bajuyo et al. | |
| 7,648,104 B1 | 1/2010 | Jakubowski, Jr. et al. | |
| 7,677,501 B1 * | 3/2010 | Hundley | B64D 1/04 |
| | | | 244/137.4 |
| 7,946,208 B1 | 5/2011 | Howard et al. | |
| 10,336,543 B1 | 7/2019 | Sills et al. | |
| 10,518,883 B2 | 12/2019 | Lewendon | |
| 10,858,102 B2 * | 12/2020 | Keller | B64D 1/02 |
| 2006/0006288 A1 * | 1/2006 | Jakubowski | B64D 1/04 |
| | | | 244/137.4 |
| 2017/0197716 A1 | 7/2017 | Taylor et al. | |
| 2019/0200534 A1 | 7/2019 | Hawkins | |
| 2020/0164982 A1 * | 5/2020 | Keller | F16B 2/10 |
| 2020/0164984 A1 * | 5/2020 | Keller | B64D 1/02 |
| 2020/0391866 A1 * | 12/2020 | Keller | B64D 1/06 |
| 2021/0163126 A1 | 6/2021 | Gray et al. | |

OTHER PUBLICATIONS

United States Patent and Trademark Office, "Notice of Allowance and Fee(s) Due," issued in connection with U.S. Appl. No. 16/200,211, dated Aug. 5, 2020, 5 pages.

United States Patent and Trademark Office, "Non-Final Office Action," issued in connection with U.S. Appl. No. 16/200,238, dated Jul. 7, 2021, 11 pages.

United States Patent and Trademark Office, "Non-Final Office Action," issued in connection with U.S. Appl. No. 16/200,211, dated Jan. 2, 2020, 6 pages.

United States Patent and Trademark Office, "Notice of Allowance and Fee(s) Due," issued in connection with U.S. Appl. No. 16/200,238, dated Jan. 12, 2022, 7 pages.

United States Patent and Trademark Office, "Non-Final Office Action," issued in connection with U.S. Appl. No. 16/439,338, dated Jul. 6, 2021, 4 pages.

United States Patent and Trademark Office, "Final Office Action," issued in connection with U.S. Appl. No. 16/439,338, dated Nov. 17, 2021, 5 pages.

United States Patent and Trademark Office, "Advisory Action," issued in connection with U.S. Appl. No. 16/439,338, dated Jan. 28, 2022, 3 pages.

United States Patent and Trademark Office, "Notice of Allowance and Fee(s) Due," issued in connection with U.S. Appl. No. 16/439,338, dated Jul. 21, 2022, 8 pages.

* cited by examiner

CONTAINER RETENTION AND RELEASE APPARATUS HAVING INTEGRAL SWAYBRACE AND RETENTION FEATURES

FIELD OF THE DISCLOSURE

This disclosure relates generally to aircraft and, more particularly, to container retention and release apparatus having integral swaybrace and retention features.

BACKGROUND

When suspending disposable containers (e.g., a weapon, a payload, a cargo container, etc.) from aircraft, it is desirable to provide suitable chocks or swaybraces to steady the container while carrying the container in flight to the point at which the container is released. Military aircraft that are used to dispense bombs, rockets, and other stores in flight usually include racks located beneath the wings and/or fuselage, or in weapon bays designed to release the stores upon command. Commercial aircraft that are used to dispense containers in flight usually include a retention and/or release system located beneath the fuselage (e.g., a belly of the fuselage).

SUMMARY

In some examples, a container retention and release apparatus includes an actuator a swaybrace and retention assembly pivotally coupled to the actuator. The swaybrace and retention assembly pivot relative to the actuator between a first position to retain a container and a second position to release the container.

In some examples, a container retention and release apparatus includes a first cylinder assembly that includes a first cylinder, a first piston movably coupled to the first cylinder, and a first swaybrace coupled to a first end of the first piston. The first swaybrace has a first arm and a second arm. The first arm is to be pivotally coupled to the second arm. A first retention pin is coupled to the first arm to interface with a first receptacle in a container. A second retention pin is coupled to the second arm to interface with a second receptacle in the container. The second receptacle in the container is spaced from the first receptacle.

In some examples, a method includes: moving an actuator between a first stroke position and a second stroke position; and releasing the container by pivoting a swaybrace relative to the container to remove a retainer pin from a receptacle of the container.

Figure 1:
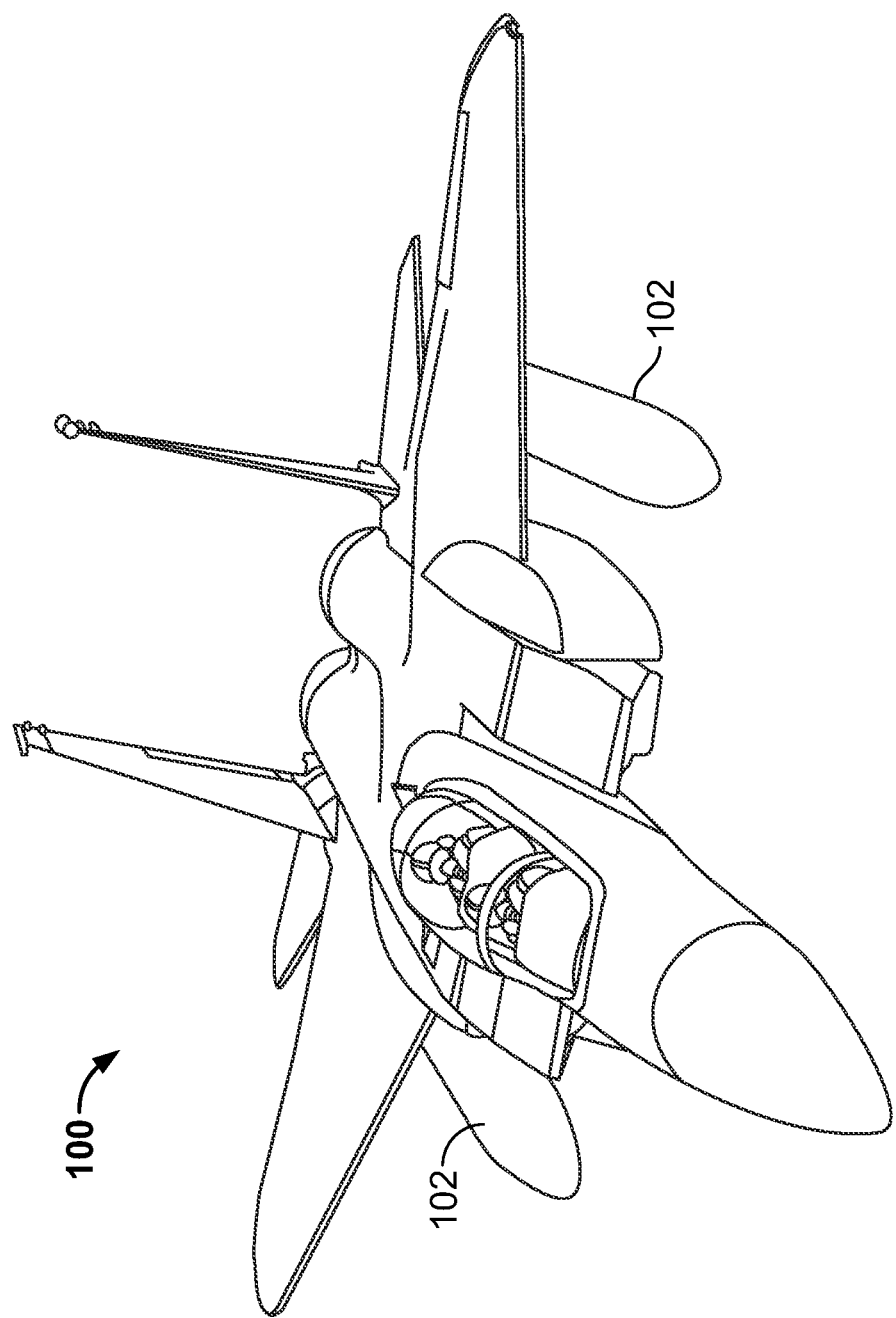
FIG. 1 is a perspective view of an example aircraft that can be implemented with an example container retention and release apparatus disclosed herein.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts. Additionally, several examples have been described throughout this specification. Any features from any example can be included with, a replacement for, or otherwise combined with other features from other examples.

DETAILED DESCRIPTION

Containers (e.g., stores, weapons, missiles, etc.) can be attached to and released from an aircraft. Containers can be used to carry munitions or other material (e.g., bombs, rockets, missiles, rations, etc.) to be dropped from the aircraft upon command. To carry and dispense containers upon command, aircraft often employ container retention and release apparatus (e.g., bomb racks) located beneath the wings and/or fuselage.

However, when coupled beneath the wings and/or fuselage, containers (e.g., missiles) can be exposed to many sources of mechanical vibration that can affect system reliability, safety, and mission effectiveness. One of the most significant exposures to vibration occurs when a missile is being carried by an aircraft (e.g., a military aircraft, a helicopter) or other aviation platform, which is a condition known as captive carry.

Some known container ejector apparatus employ hooks and/or other retention apparatus to hold the container in captive carry flight. To this end, additional structural contact points within the container are often needed for swaybraces and/or retainers to constrain the container in captive carry flight. For example, the containers typically include protruding lugs, hangers, and/or other fasteners that provide the container attachment points which couple with the swaybraces and/or other retainers to constrain the container. However, the protruding lugs, hangers, and/or other retention contact points result in aerodynamic drag on the container (e.g., a missile) after release of the container from the host aircraft while in free flight of the container that reduces container or weapon performance (e.g., a flight range of a missile). The separate lugs/hangers and/or swaybrace contact points add structural weight to the container and reduce available volume for payload within the container. To engage a hook mechanism of a conventional container retention and release apparatus, a container is accurately positioned or aligned (e.g., vertically) relative to the container retention and release apparatus. Some containers (e.g., weapons) include foldable lugs to mitigate the aerodynamic and/or detectability penalty due to protruding lugs or hangers. However, the use of foldable lugs results in loss of internal volume in a container, increased weight of the container, increased difficulty of loading the container on an aircraft, and/or can cause additional difficulties for a container loading crew. Additionally, most conventional container retention and release apparatus do not control roll and/or yaw of a container during ejection of the container. Some known container ejector apparatus incorporate a constrained container release system that reduces container yaw during ejection. However, there may be a need to improve the ejector apparatus and enhance effective departure of the container (e.g., to improve accuracy of an intended trajectory).

Example container retention and release apparatus (e.g., a bomb rack) disclosed herein retain and release a captively carried container in-flight. To retain and release a container, example container retention and release apparatus disclosed herein employ an example retention apparatus (e.g., a claw). In some examples, the retention apparatus matably engages an internal container receptacle interface of a container, which eliminates the need for external container lugs, hangers and/or other retention apparatus. For example, example retention apparatus (e.g., a bomb rack) disclosed herein interfaces with one or more receptacles of a container internal to an outer mold line (OML) of the store or container. Thus, example container retention and release apparatus disclosed herein eliminate the need to provide protruding lugs, hangers, and/or attach points that would otherwise protrude from an outer surface of a container. In this manner, the container retention and release apparatus disclosed herein enable a container to have a smooth aerodynamic surface (e.g., a smooth outer surface) without external and/or internal protrusions such as lugs, hangers, or receptacles. Additionally, the retention apparatus contacts the container only at the swaybrace contact points eliminating the need for additional frames in the container for lugs or hangers, thereby reducing container weight and increasing internal volume available for payload. Further, the container retention and release apparatus disclosed herein are extendable to facilitate loading of a container with the retention apparatus. In some examples, example retention apparatus disclosed herein can be manually extended to aid with positioning a container during a loading operation.

In some examples, example container retention and release apparatus disclosed herein allow a container to roll in a roll direction (e.g., by less than 9 degrees in the roll direction) during ejection. In some examples, the container retention and release apparatus disclosed herein fully constrain a container in a roll direction, a yaw direction and a pitch axis during ejection, which reduces (e.g., minimizes) space required for both internally and externally carried weapons and/or a dimension (e.g., a height) of example container retention and release apparatus disclosed herein.

In some examples, an example retention apparatus disclosed herein includes an integral retention device and swaybrace assembly. In some examples, an example retention device and swaybrace assembly includes one or more retention pins coupled to one or more swaybrace arms. In some examples, to retain and/or release a container, the retention apparatus (e.g., a swaybrace of the retention apparatus) pivotally couples to an actuator (e.g., to an actuation member such as a piston of an actuator) of the container release and retention apparatus.

FIG. 1 is an aircraft 100 that can be implemented with an example container retention and release apparatus constructed in accordance with teachings of this disclosure. For example, example container retention and release apparatus disclosed herein can implement a bomb rack that retains and/or releases a container 102 (e.g., a store, a weapon, a missile, etc.) of the aircraft 100 of FIG. 1. The example teachings disclosed herein are not limited to the aircraft 100 of FIG. 1. For example, the container retention and release apparatus disclosed herein can be implemented with other types of aircraft such as, for example, vertical takeoff and landing aircraft, military aircraft, helicopters, drones, commercial aircraft, and/or any other type of aircraft.

Figure 2A:
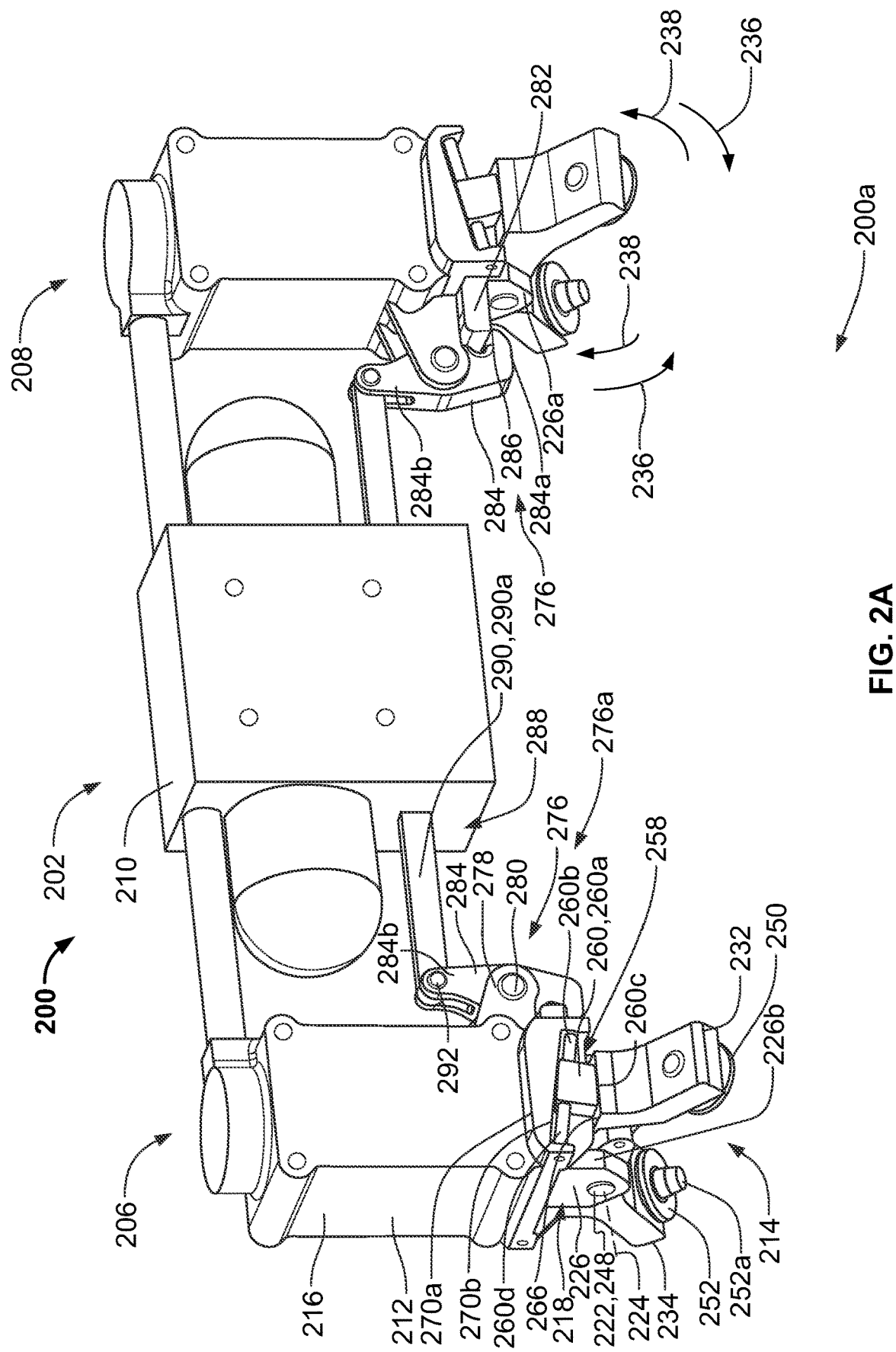
FIG. 2A is a perspective view of a first side of an example container retention and release apparatus constructed in accordance with teachings of this disclosure.
Figure 2B:
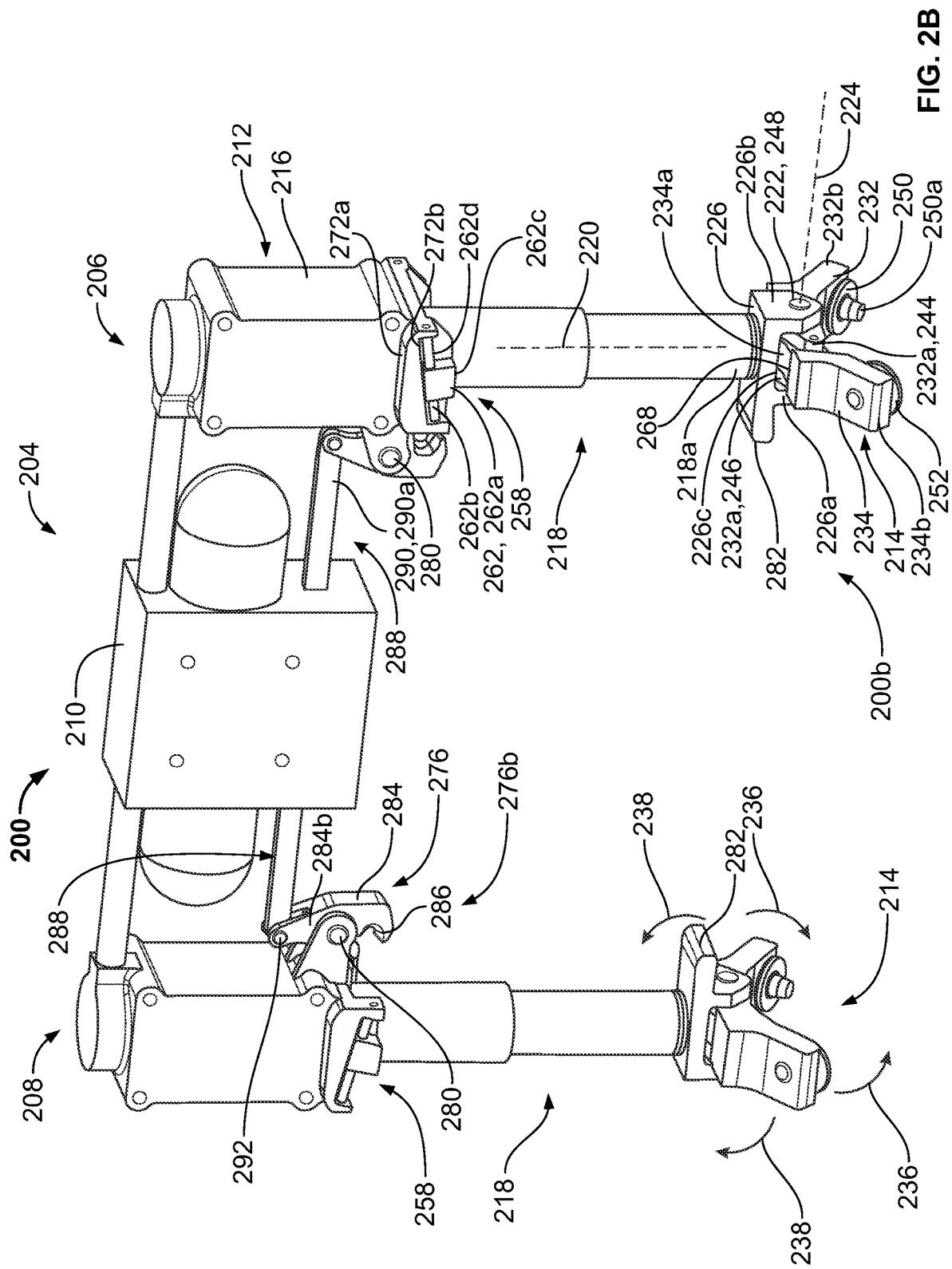
FIG. 2B is a perspective view of a second side of the example container retention and release apparatus of FIG. 2A.

FIGS. 2A and 2B are perspective views of an example container retention and release apparatus 200 disclosed herein. FIG. 2A is a perspective view of a first side 200*a* of the example container retention and release apparatus 200. FIG. 2B is a perspective view of a second side 200*b* of the container retention and release apparatus 200. FIG. 2A illustrates the container retention and release apparatus 200 in an example stored position 202. FIG. 2B illustrates the container retention and release apparatus 200 in an example deployed position 204. The aircraft 100 of FIG. 1 can implement the example container retention and release apparatus 200 disclosed herein.

To move the container retention and release apparatus 200 between the stored position 202 (e.g., shown in FIG. 2A) and the deployed position 204 (e.g., shown in FIG. 2B), the container retention and release apparatus 200 of the illustrated example includes a first ejector assembly 206, a second ejector assembly 208, and an energy source 210. The energy source 210 of the illustrated example can be a pneumatic energy source, a hydraulic energy source, a pyrotechnic energy source and/or any other energy source to provide energy to actuate the first ejector assembly 206 and the second ejector assembly 208. The first ejector assembly 206 and the second ejector assembly 208 move together (e.g., synchronously) upon activation of the energy source 210 to release a container. The second ejector assembly 208 is identical (e.g., a mirror image) in both structure and function to the first ejector assembly 206. For brevity and clarity, the first ejector assembly 206 will be discussed in conjunction with the second ejector assembly 208. Each of the first ejector assembly 206 and the second ejector assembly 208 retains and releases a container.

To retain and/or release a container, the first ejector assembly 206 of the illustrated example includes an actuator 212 and a swaybrace and retention assembly 214 (e.g., a retention device, a claw, a retainer, a clamp, etc.). Specifically, the swaybrace and retention assembly 214 is pivotally coupled to the actuator 212. The actuator 212 of the illustrated example includes a cylinder 216 and a piston 218 movably (e.g., slidably) coupled relative to the cylinder 216. The piston 218 of the illustrated example moves relative to the cylinder 216 in a rectilinear direction along a longitudinal axis 220 (FIG. 2B) of the piston 218. The swaybrace and retention assembly 214 of the illustrated example is coupled to the piston 218. In particular, the swaybrace and retention assembly 214 is pivotally coupled to a first end 218a of the piston 218 about a pivot 222. The pivot 222 of the illustrated example defines a pivot axis 224 that is non-parallel relative to (e.g., intersects) the longitudinal axis 220 of the piston 218. For example, the pivot axis 224 is substantially perpendicular relative to the longitudinal axis 220 of the piston 218. As used herein, substantially perpendicular means approximately perpendicular (e.g., within 5% of perpendicularity) or perfectly perpendicular (e.g., a 90 degree angle).

To receive or pivotally support the swaybrace and retention assembly 214, the piston 218 of the illustrated example includes a mounting bracket 226 (e.g., a mounting plate). Specifically, the mounting bracket 226 of the illustrated example is integral with the piston 218 and defines the first end 218a of the piston 218. For example, the mounting bracket 226 can be integrally formed with the piston 218 or coupled to the piston 218 via welding, a fastener (e.g., a screw, a pin, etc.) and/or otherwise fastened or connected to the piston 218. To receive the swaybrace and retention assembly 214, the mounting bracket 226 of the illustrated example includes a first flange 226a (e.g., a first plate) spaced from a second flange 226b (e.g., a second plate) that define an opening 226c.

The swaybrace and retention assembly 214 of the illustrated example is pivotally coupled to the piston 218 via the mounting bracket 226. The swaybrace and retention assembly 214 of the illustrated example has a first arm 232 and a second arm 234 (e.g., a clam shell configuration). The first arm 232 and the second arm 234 rotate about the pivot 222 and move in a first direction 236 (e.g., a first rotational direction away from the piston 218 or in a downward direction in the orientation of FIGS. 2A and 2B) to retain a container, and the first arm 232 and the second arm 234 rotate about the pivot 222 and move in a second direction 238 (e.g., a second rotational direction toward the piston 218 or in an upward direction in the orientation of FIGS. 2A and 2B) opposite the first direction 236 to release a container. Referring to FIG. 2B, the first arm 232 includes a first end 232a and a second end 232b. The first end 232a of the first arm 232 includes a first flange 244 and a second flange 246 spaced from the first flange 244 (e.g., a yoke or clevis). The second arm 234 includes a first end 234a and a second end 234b. The first end 234a of the second arm 234 is located or positioned between the first flange 244 and the second flange 246 when the first arm 232 is coupled to the second arm 234. For example, the first end 232a of the first arm 232 and the first end 234a of the second arm 234 form a yoke and rod end connection. A fastener 248 (e.g., a pin) is received by respective openings of the first flange 226a, the second flange 226b, the first flange 244, the second flange 246 and the first end 234a to define the pivot 222 (e.g., to pivotally couple the first and second arms 232, 234 to the piston 218 via the mounting bracket 226). To facilitate pivotal movement of the first and second arms 232, 234, the respective openings of the first flange 244 and the second flange 246 of the first arm 232 and/or the opening of the first end 234a of the second arm 234 can include a bushing or a bearing. The first arm 232 of the illustrated example can pivot independently from the second arm 234. In other words, although the first end 232a of the first arm 232 and the second end 234b of the second arm 234 are pivotally coupled about the pivot axis 224 (e.g., a common pivot), the first arm 232 is not fixed to the second arm 234 in such a manner that pivotal movement of one of the first arm 232 or the second arm 234 does not cause (e.g., simultaneous) pivotal movement of the other one of the first arm 232 or the second arm 234. In some examples, the first arm 232 and the second arm 234 can pivot simultaneously or concurrently relative to the pivot 222.

To retain a container, the swaybrace and retention assembly 214 of the illustrated example includes a first retainer 250 and a second retainer 252. Specifically, the second end 232b of the first arm 232 includes the first retainer 250 and the second end 234b of the second arm 234 includes the second retainer 252. The first retainer 250 is coupled (e.g., threadably coupled, welded, fastened or integrally formed) to the second end 232b of the first arm 232 and the second retainer 252 is coupled (e.g., threadably coupled, welded, fastened or integrally formed) to the second end 234b of the second arm 234. The first retainer 250 of the illustrated example includes a first pin 250a and the second retainer 252 of the illustrated example includes a second pin 252a. The first retainer 250 is oriented toward the second retainer 252. For example, the first pin 250a protrudes from the second end 232b of the first arm 232 in a direction away from the first end 218a of the piston 218 and toward the longitudinal axis 220 of the piston 218 (e.g., toward the second retainer 252). The second pin 252a protrudes from the second end 234b of the second arm 234 in a direction away from the first end 218a of the piston 218 and toward the longitudinal axis 220 of the piston 218 (e.g., toward the first retainer 250).

To restrict or prevent pivotal movement of the swaybrace and retention assembly 214 (e.g., the first and second arms 232, 234) when the container retention and release apparatus 200 is in the stored position 202, the container retention and release apparatus 200 of the illustrated example includes a lock 258. The lock 258 of the illustrated example prevents pivotal movement of the first arm 232 and the second arm 234 in the second direction 238 (e.g., in the direction toward the piston 218) when the container retention and release apparatus 200 is in the stored position 202. The lock 258 of the illustrated example include a first lock 260 located on the first side 200a of the container retention and release apparatus 200 and a second lock 262 located on the second side 200b of the container retention and release apparatus 200. Specifically, the first lock 260 interfaces with the first arm 232 and the second lock 262 interfaces with the second arm 234. For example, the first lock 260 of the illustrated example engages a first surface 266 (e.g., a bearing surface) of the first arm 232 (e.g., defined at the first end 232a of the first arm 232) and the second lock 262 engages a second surface 268 (e.g., a bearing surface) of the second arm 234 (e.g., defined by the first end 234a of the second arm 234).

The first lock 260 of the illustrated example is a first wedge 260a slidably coupled to a first guide 260b that is supported by the cylinder 216. For example, the cylinder 216 includes a first flange 270a defining a first recessed opening 270b to support the first guide 260b. Similarly, the second lock 262 of the illustrated example is a second wedge 262a slidably coupled to a second guide 262b that is supported by the cylinder 216. For example, the cylinder 216 includes a second flange 272a defining a second recessed opening 272b to support the second guide 262b. To allow the swaybrace and retention assembly 214 (e.g., to adjust to different stored or initial positions) to accommodate different sized containers (e.g., weapons or stores), the first wedge 260a is adjustable along a length of the first guide 260b and the second wedge 262a is adjustable along a length of the second guide 262b.

The first guide 260b has a longitudinal axis that is non-parallel relative to horizontal. In other words, the first guide 260b is positioned at an angle relative to horizontal (e.g., the pivot axis 244a). The first wedge 260a includes a first tapered surface 260c to engage the first surface 266 of the first arm 232. Likewise, the second guide 262b has a longitudinal axis that is non-parallel relative to horizontal. In other words, the second guide 262b is positioned at an angle relative to horizontal (e.g., the pivot axis). The second wedge 262a includes a second tapered surface 262c to engage the second surface 268 of the second arm 234. To increase a retention force of the lock 258 when the container retention and release apparatus 200 is in the stored position 202, the first lock 260 includes a first biasing element 260d (e.g., a spring) to bias the first lock 260 toward the first surface 266 of the first arm 232 and the second lock 262 includes a second biasing element 262d (e.g., a spring) to bias the second lock 262 toward the second surface 268 of the second arm 234. The first biasing element 260d enables the first wedge 260a to adjust along the first guide 260b and the second biasing element 262d enables the second wedge 262a to adjust along the second guide 262b to enable the lock 258 to accommodate different sized (e.g., different diameter) containers.

To restrict or prevent (e.g., rectilinear) movement of the piston 218 relative to the cylinder 216 when the container retention and release apparatus 200 is in the stored position 202, the container retention and release apparatus 200 of the illustrated example includes a latch 276. The latch 276 is movable between a first or latch position 276a to secure the piston 218 and a second or unlatch position 276b to release the piston 218. For example, the latch 276 of the illustrated example is coupled to the cylinder 216 via a bracket 278 formed with the cylinder 216. The latch 276 is pivotally coupled to the bracket 278 via a pin 280. To engage or couple to the piston 218, the latch 276 of the illustrated example engages or interfaces with a locking flange 282 formed adjacent the first end 218a of the piston 218. Specifically, the mounting bracket 226 of the illustrated example includes the locking flange 282. For example, the locking flange 282 is integrally formed with the mounting bracket 226. The locking flange 282 of the illustrated example is substantially perpendicular relative to the first flange 226a and the second flange 226b. The latch 276 of the illustrated example includes a body 284 having a hook 286 at a first end 284a of the body 284 that removably couples or engages to the locking flange 282 of the piston 218. To move the latch 276 between the latch position 276a and the unlatch position 276b, the container retention and release apparatus 200 of the illustrated example includes a drive system 288. For example, the drive system 288 includes a transmission 290 that operatively couples to a second end 284b of the body 284. For example, the second end 284b is a yoke or clevis end to receive a link 290a (e.g., a bar) of the transmission 290. A pin 292 pivotally couples the second end 284b of the body 284 to the link 290a. The drive system 288 includes a drive (e.g., a motor, an actuator, etc.) to move or toggle the latch 276 about the pin 280 between the latch position 276a to engage the locking flange 282 and the unlatch position 276b to release the locking flange 282.

As noted above, the second ejector assembly 208 is identical to the first ejector assembly 206. The second ejector assembly 208 includes a cylinder 216 (e.g., a second cylinder), a piston 218 (e.g., a second piston), a swaybrace and retention assembly 214 (e.g., a second swaybrace and retention assembly) that includes a first arm 232 (e.g., a third arm) and a second arm 234 (e.g., a fourth arm) pivotally coupled to the piston 218 via a mounting bracket 226 (e.g., a second mounting plate), a first retainer 250 (e.g., a third retainer), a first pin 250a (e.g., a third pin), a second retainer 252 (e.g., a fourth retainer), and a second pin 252a (e.g., a fourth pin). The first ejector assembly 206 and the second ejector assembly 208 of the illustrated example operate together to move a container between the stored position 202 and the deployed position 204.

Figure 3A:
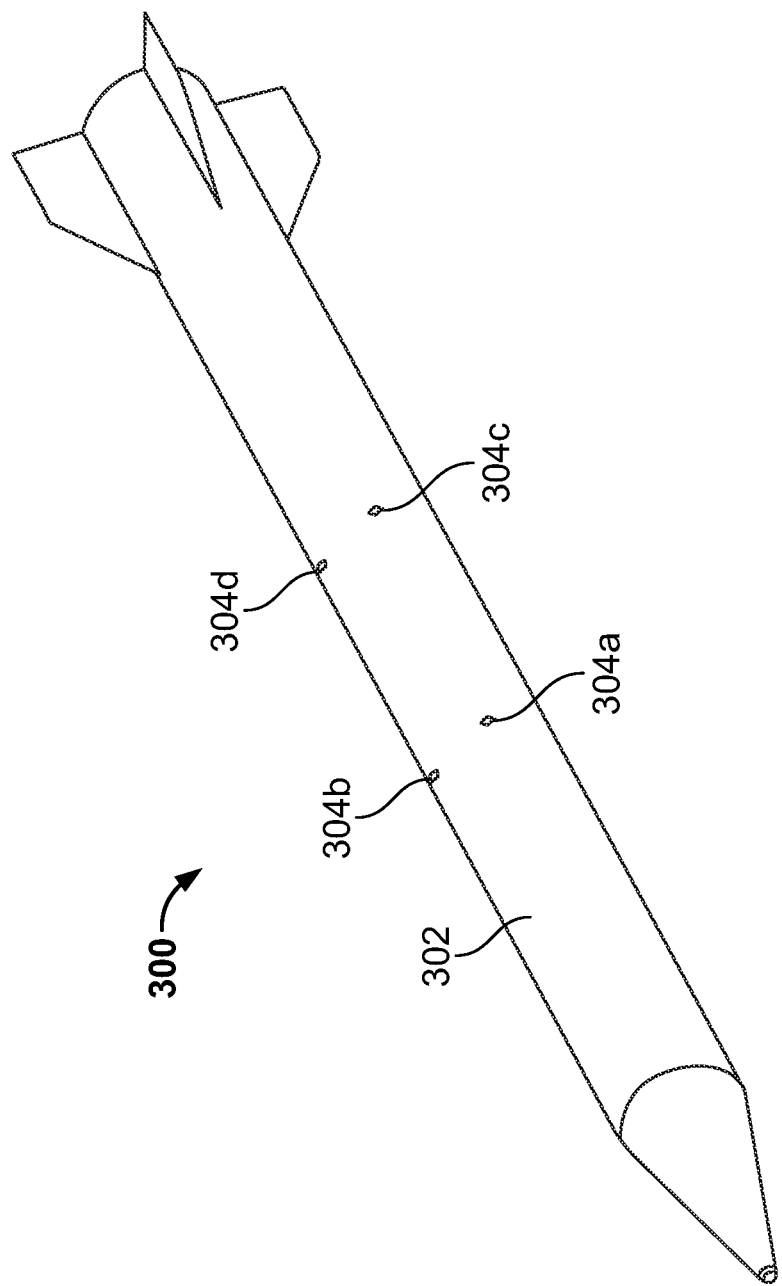
FIG. 3A is a perspective view of an example container that can be carried by the example container retention and release apparatus of FIGS. 2A-2B.

FIG. 3A is a perspective view of a container 300 that can be retained by the container retention and release apparatus 200 of FIGS. 2A and 2B. The container 300 of the illustrated example is a store or weapon (e.g., the container 102 of FIG. 1). The container 300 includes a body 302 having a cylindrical shape. The body 302 of the illustrated example includes a plurality of openings 304a-d (e.g., receptacles) to receive respective ones of the first and second pins 250a and 252b of the first arm 232 and the second arm 234 of the first ejector assembly 206 and the second ejector assembly 208. For example, the container 300 of the illustrated example includes four openings 304a-d.

Figure 3C:
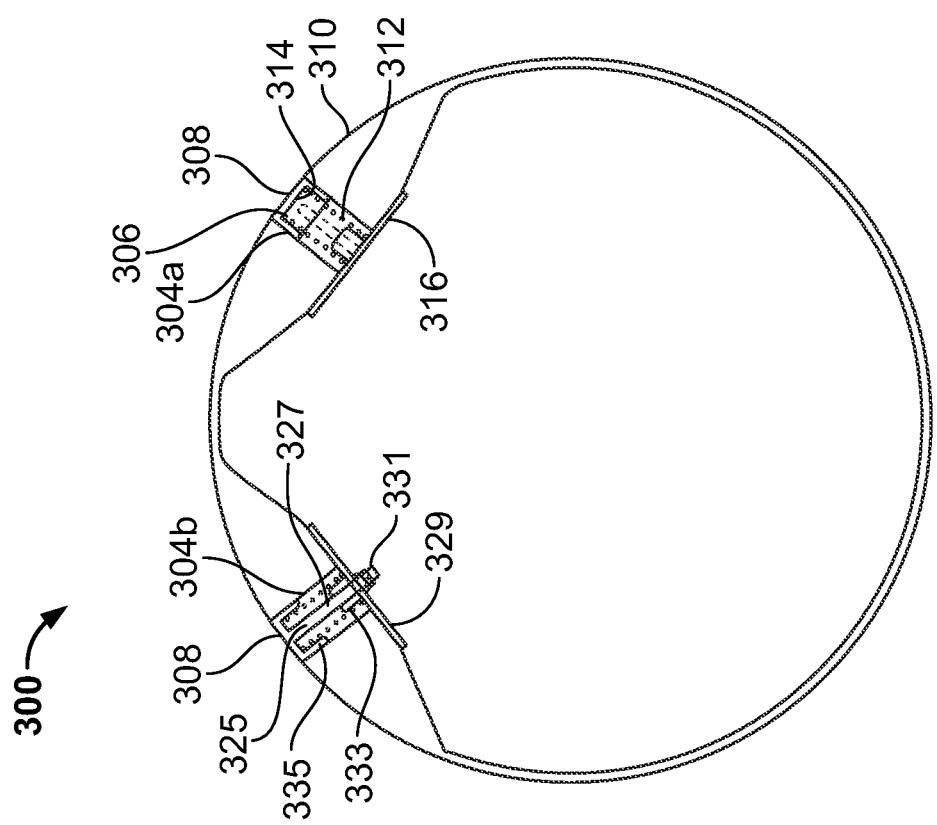
FIG. 3C is a cross-sectional view of the example container of FIG. 3A but implemented with an example first cover and an example second cover.
Figure 3B:
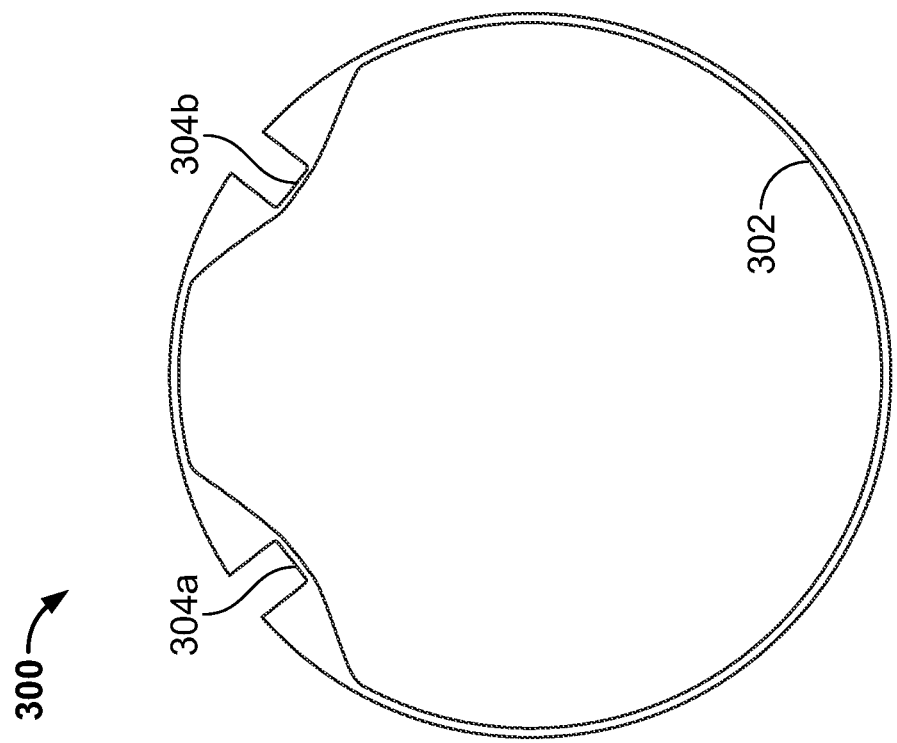
FIG. 3B is cross-sectional view of the example container of FIG. 3A.

FIG. 3B is a cross-sectional view of the container of FIG. 3A showing the openings 304a and 304b. The openings 304a, 304b are bores formed in the outer surface of the body 302. The body 302 portion supporting the openings 304a, 304b (and the openings 304c-d) is reinforced (e.g., has a greater thickness or greater amount of material). In some examples, the openings 304a-d and/or the cover 306 can be coated with a radar absorbent material to reduce detectability by radar. In some examples, the openings 304a-d can include one or more covers.

For example, FIG. 3C is a cross-sectional view of the example container 300 disclosed herein including a first cover 306 located in the first opening 304a and a second cover 325 (different than the first cover 306) located in the second opening 304b. The first cover 306 and the second cover 325 are movably coupled relative to the body 302 of the container 300. The first cover 306 and the second cover 325 are movable between an open position to receive a respective one of the first and second pins 250a and 252b when the container 300 is coupled to the container retention and release apparatus 200 and a closed position when the container 300 is released from the container retention and release apparatus 200. In the closed position, an outer surface 308 of the first cover 306 and the second cover 325 are flush relative to an outer surface 310 of the body 302. To this end, the first and second openings 304a, 304b does not affect an aerodynamic characteristic (e.g., performance) of the container 300 when the container 300 is released from the container retention and release apparatus 200.

The cover 306 of the illustrated example is biased toward the closed position via one or more biasing elements 312 (e.g., a coil spring). The biasing elements 312 are positioned between a first spring seat 314 and a second spring seat 316. The first spring seat 314 of the illustrated example includes apertures or bores formed on an inner surface of the cover 306 that receives a first end of the biasing elements 312 and the second spring seat 316 is a support plate to receive a second end of the biasing elements 312.

The cover 325 of the illustrated example is biased toward the closed position via a biasing element 333 (e.g., a coil spring). The biasing element 333 is positioned between a first spring seat 335 and a second spring seat defined by the plate 329. The second cover 325 includes a stem 327 that extends through a plate 329. A fastener 331 is coupled to an end of the stem and provides a stop when the cover 325 moves to a closed position (e.g., as shown in FIG. 3B). When the second pin 252a is inserted in the second opening 304b, the second pin 252a causes the second cover 325 to move toward the plate 329, causing the fastener 331 to move away from the plate 329. When the second pin 252a is withdrawn from the second opening 304b, the biasing element 333 causes the cover 325 to move away from the plate 329 until the fastener 331 engages the plate 329.

Figure 4A:
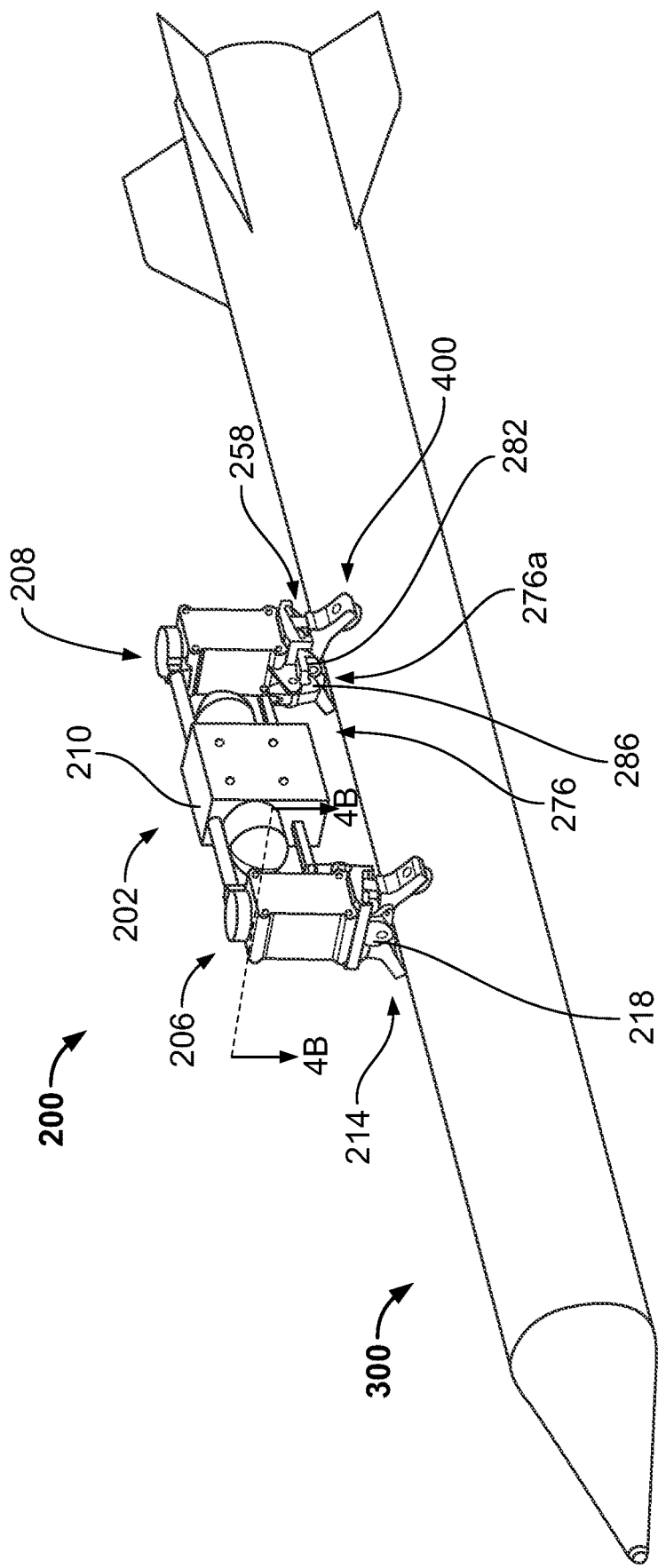
FIG. 4A is a perspective view of the example container retention and release apparatus of FIGS. 2A and 2B coupled to the example container of FIG. 3A shown in an example stored position.
Figure 4B:
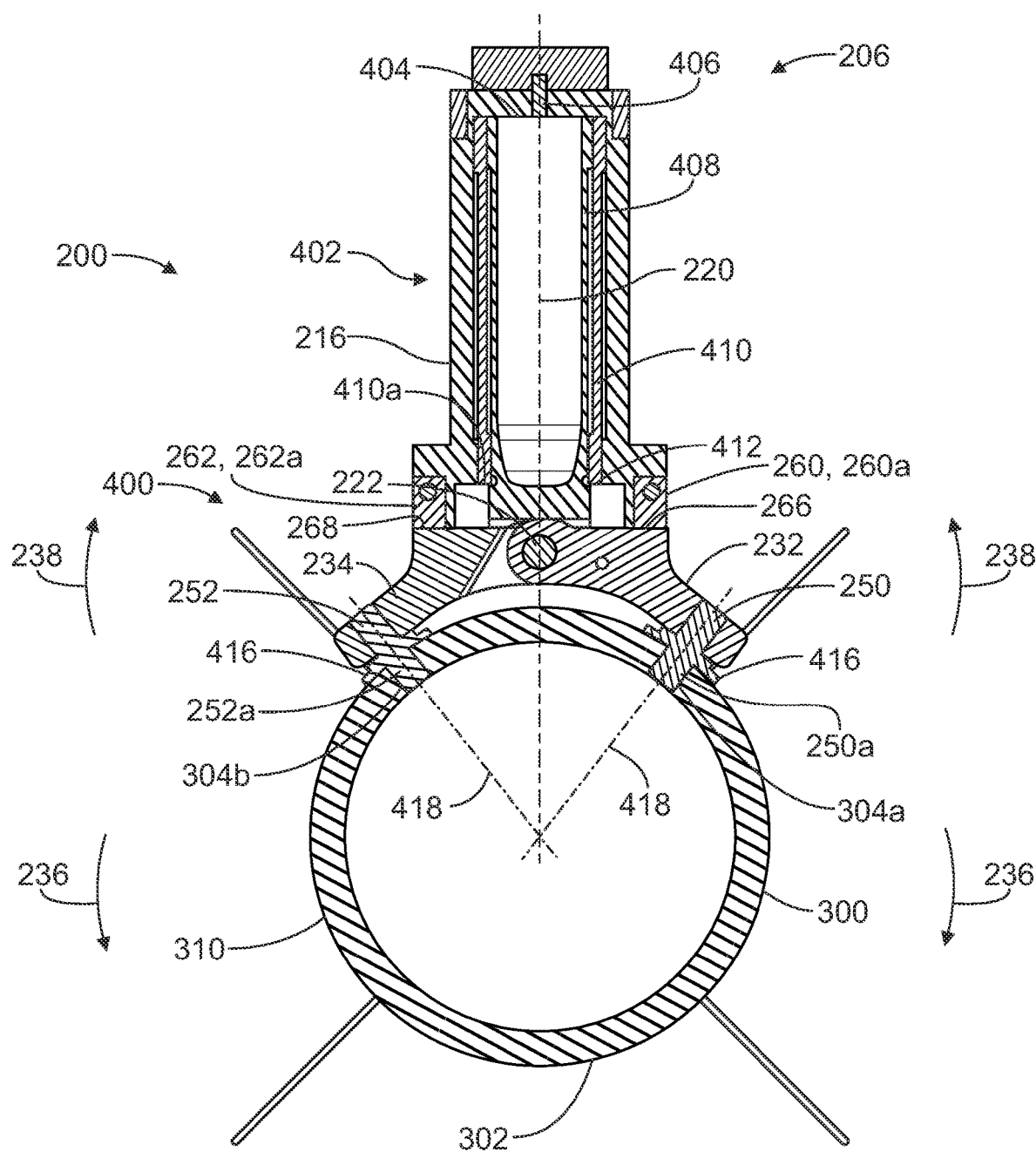
FIG. 4B is a cross-sectional view taken along line 4B-4B of FIG. 4A.

FIG. 4A is a perspective view of the container retention and release apparatus 200 of FIGS. 2A and 2B coupled to the container 300 of FIG. 3. FIG. 4B is a front, cross-sectional view of the container retention and release apparatus 200 and the container 300 taken along 4B-4B of FIG. 4A. Referring to FIGS. 4A and 4B, the container retention and release apparatus 200 is in the stored position 202.

In the stored position 202, the piston 218 of the first ejector assembly 206 (and the piston 218 of the second ejector assembly 208) is in a first stroke position 402 (and the piston 218 of the second ejector assembly 208). The cylinder 216 of the illustrated example defines a cavity 404 to receive (e.g., at least a portion of) the piston 218 when the piston 218 is in the first stroke position 402. The cylinder 216 includes a port 406 to receive energy (e.g., pneumatic air, hydraulic oil, etc.) from the energy source 210. The piston 218 of the illustrated example includes a first or inner portion 408 (e.g., including a piston head) and a second or outer portion 410 (e.g., a sleeve). Specifically, the inner portion 408 is slidably coupled to the outer portion 410, and the inner and outer portions 408, 410 are slidably coupled to the cylinder 216. For example, the inner portion 408 is nested with the outer portion 410 when the piston 218 is in the first stroke position 402. In the stored position, the latch 276 is in the latched position 276a. For example, the hook 286 is engaged with the locking flange 282 of the piston 218 to prevent the inner portion 408 and the outer portion 410 from moving relative to the cylinder 216. Specifically, inner portion 408 of the piston 218 includes a shoulder 412 (e.g., formed via an annular recess on an outer surface of the inner portion 408) that is to engage a first end 410a of the outer portion 410 to restrict movement of the outer portion 410 relative to the inner portion 408.

In the stored position 202, the swaybrace and retention assembly 214 is in a clamping position 400 and provides a clamping or holding force to retain the container 300 coupled to the container retention and release apparatus 200. Specifically, the interaction between the first and second retainers 250, 252 relative to the container 300 and the interaction between the lock 258 and the first and second arms 232, 234 generate the clamping and holding force provided by the swaybrace and retention assembly 214. For example, in the stored position 202, the first and second locks 260, 262 are in engagement with the respective first and second surfaces 266, 268 of the first and second arms 232, 234 and prevent or restrict rotation of the first and second arms 232, 234 about the pivot 222 in the second direction 238. In turn, the first and second wedges 260a, 262a impart forces to the respective first and second arms 232, 234 in the first direction 236. Additionally, the first retainer 250 and the second retainer 252 are in engagement with the outer surface 310 of the body 302. Each of the first and second retainers includes a flange 416 to engage (e.g., brace against) the outer surface 310 of the body 302 of the container 300.

Additionally, the first pin 250a is engaged with (e.g., at least partially inserted in) the first opening 304a and the second pin 252a is engaged with (e.g., at least partially inserted in) the second opening 304b. The covers 306 of the openings 304a-d are not shown for clarity. To this end, engagement between the first lock 260 and the first surface 266 and the engagement between the flange 416 of the first retainer 250 with the outer surface 310 of the container 300 prevents rotation of the first arm 232 about the pivot 222 in the first direction 236 and the second direction 238. Likewise, engagement between the second lock 262 and the second surface 268 and the engagement between the flange 416 of the second retainer 252 with the outer surface 310 of the container 300 prevents rotation of the second arm 234 about the pivot 222 in the first direction 236 and the second direction 238. Each of the first pin 250a and the second retention pin 252a has a longitudinal axis 418 that is angled or canted relative to the longitudinal axis 220 of the piston 218. For example, the longitudinal axes 418 are at an angle of between approximately 25 degrees and 85 degrees relative to the longitudinal axis 220. Thus, the first arm 232 and the second arm 234 provide the clamping or holding force in a direction toward the body 302 of the container 300 (e.g., along the longitudinal axis 418 of the respective first and second pins 250a, 252a). Further, engagement between the first pin 250a and the second pin 252a with the respective first and second openings 304a, 304b provides a bearing force to retain the container 300 coupled to the swaybrace and retention assembly 214.

Figure 5:
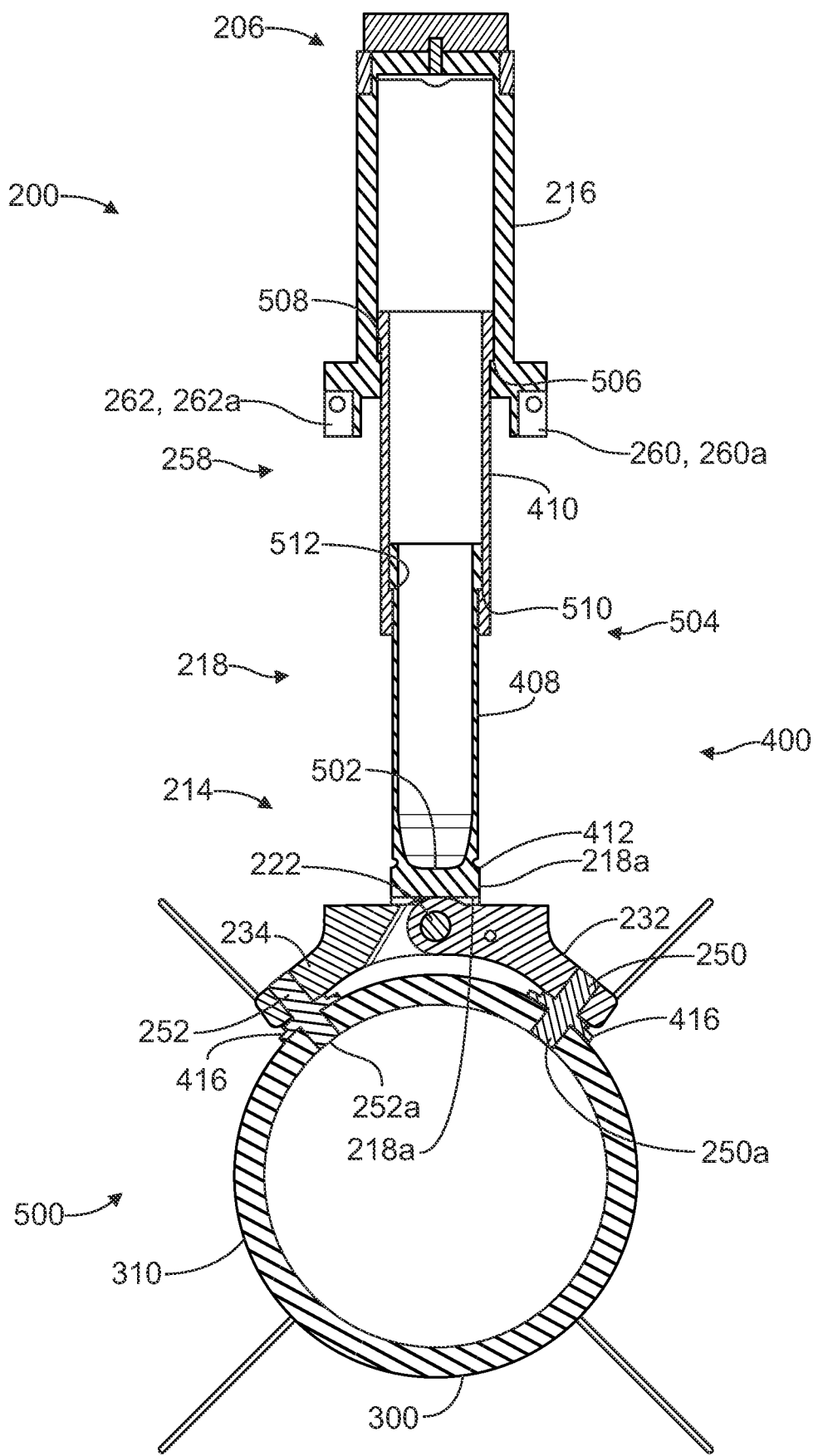
FIG. 5 is a cross-sectional view similar to FIG. 4B but showing the example container retention and release apparatus in an example deployed position.

FIG. 5 is a front, cross-sectional view similar to FIG. 4B, but showing the container retention and release apparatus 200 in the deployed position 204 and the swaybrace and retention assembly 214 in an intermediate clamping position 500. In the deployed position 204, the container retention and release apparatus 200 moves the container 300 away from the cylinder 216 (e.g., away from the aircraft 100) to release the container 300. To move the container retention and release apparatus 200 to the deployed position 204, the drive system 288 (FIGS. 2A and 2B) disengages or releases the latch 276 from the piston 218. Specifically, the latch 276 moves to the unlatched position 276b shown in FIG. 2B. The energy source 210 provides energy (e.g., pressurized fluid) in the cavity 404 via the port 406 of the cylinder 216 that imparts a force on a second side 502 of the piston 218 opposite the first end 218a to cause the piston 218 to move to a second stroke position 504 (e.g., an end of stroke position). The piston 218 moves to the second stroke position 504 to position the container 300 away from the cylinder 216 prior to releasing the container 300 from the container retention and release apparatus 200. When the piston 218 exits the cylinder 216 (e.g., the piston 218 moves from the first stroke position 402 to the second stroke position 504), the outer portion 410 slides relative to the cylinder 216 (with the inner portion 308 nested with the outer portion 410). Specifically, the outer portion 410 moves relative to the cylinder 216 until a first shoulder 506 of the outer portion 410 engages a second shoulder 508 of the cylinder 216. Engagement between the first shoulder 506 of the outer portion 410 and the second shoulder 508 of the cylinder 216 causes the inner portion 408 to move relative to the outer portion 410. Specifically, the inner portion 408 moves relative to the outer portion 410 in a direction away from the cylinder 216 until a third shoulder 510 of the inner portion 408 engages a fourth shoulder 512 of the outer portion 410. Thus, the piston 218 moves to the second stroke position 504 (e.g., an end of stroke position) when the first shoulder 506 engages the second shoulder 508 (e.g., the outer portion 410 is in a fully extended position relative to the cylinder 216) and the third shoulder 510 engages the fourth shoulder 512 (e.g., the inner portion 408 is in a fully extended position relative to the outer portion 410). During extension of the piston 218 from the cylinder 216 (e.g., as the piston 218 moves from the first stroke position 402 to the second stroke position 504), the swaybrace and retention assembly 214 (e.g., the first and second arms 232, 234) can rotate freely about the pivot 222. However, ejection forces generated by the energy source 210 maintain the swaybrace and retention assembly 214 in the intermediate clamping position 500. In the intermediate clamping position 500, the first and second retainers 250, 252 remain engaged with the outer surface 310 of the container 300. In other words, the first and second pins 250a, 252a remain engaged with the respective first and second openings 304a, 304b when the piston 218 moves between the first stroke position 402 and the second stroke position 504. However, the swaybrace and retention assembly 214 is in the intermediate clamping position 500 because the first and second arms 232 and 234 are no longer in engagement with the respective first and second locks 260, 262.

Figure 6:
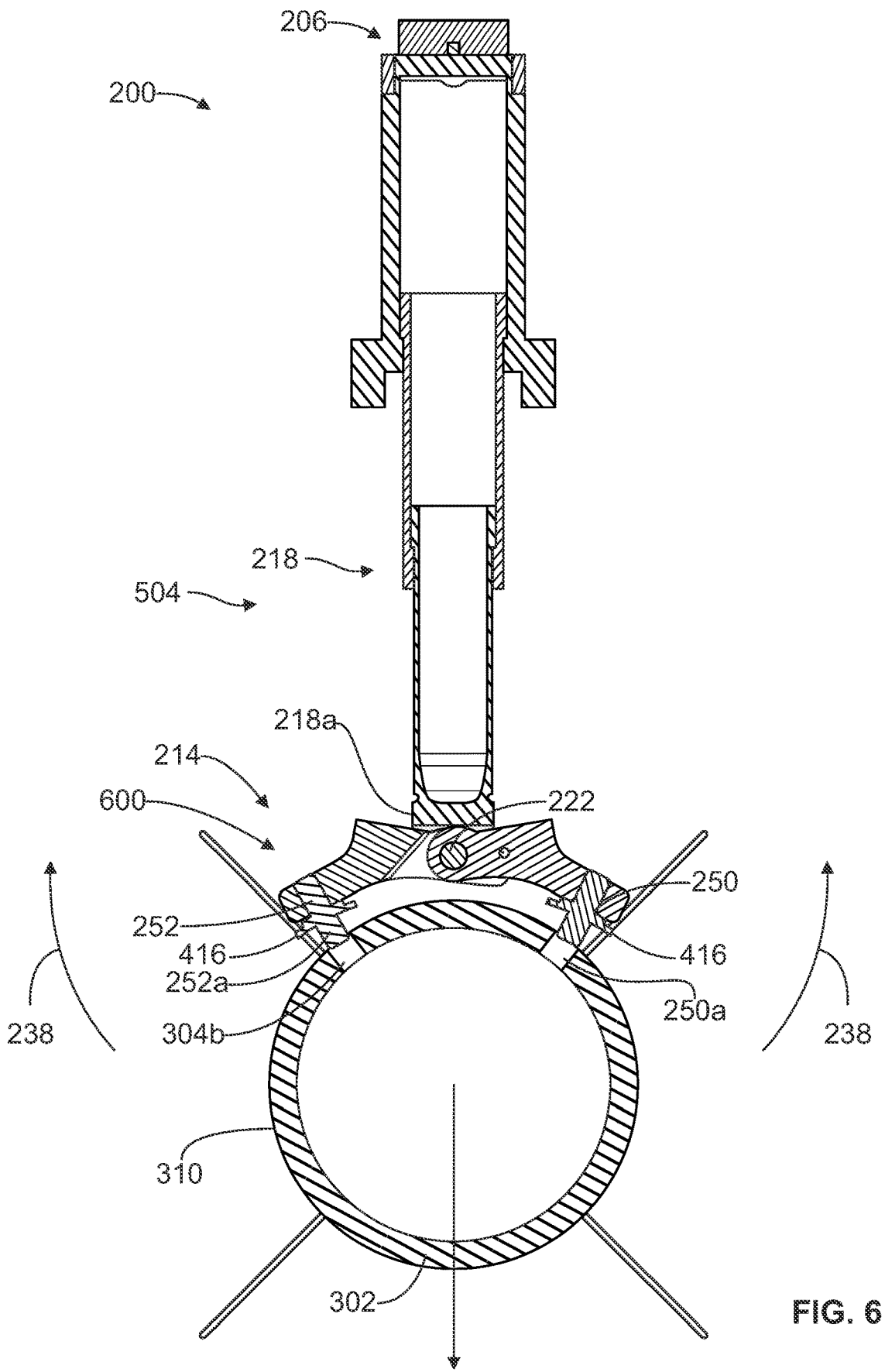
FIG. 6 is a cross-sectional view similar to FIG. 4B but showing the example container retention and release apparatus in an example release position.

FIG. 6 is a front, cross-sectional view similar to FIG. 4B, but showing the container retention and release apparatus 200 in a deployed position 204 and the swaybrace and retention assembly 214 in a release position 600. As the piston 218 reaches the second stroke position (e.g., an end of stroke position), inertia of the container 300 imparts a moment force on the swaybrace and retention assembly 214. The moment force causes the first arm 232 and the second arm 234 to rotate about the pivot 222, causing the second ends 232b and 234b of the first and second arms 232, 234 to rotate in the second direction 238. As the first and second arms 232, 234 rotate about the pivot 222 in the second direction 238, the first retainer 250 and the second retainer 252 disengage the container 300. Additionally, the first pin 250a disengages (e.g., withdraws from) the first opening 304a of the container 300 and the second pin 252a disengages (e.g., withdraws from) the second opening 304b of the container 300, thereby releasing the container 300. A dimensional clearance between the first and second openings 304a, 304b and the respective first and second pins 250a, 252a allows slight rotation or movement of the first and second pins 250a, 252a in the respective first and second openings 304a, 304b that enables the first and second arms 232, 234 to rotate to release the container 300. Thus, the swaybrace and retention assembly 214 (e.g., the first and second arms 232, 234) pivot between the clamping position 400 to cause the first and second pins 250a, 252a to engage the respective openings 304a-b (e.g., receptacles) of the container 300 and the release position 600 to cause the first and second pins 250a, 252a to disengage the respective openings 304a-b.

The example container retention and release apparatus 200 controls an orientation of the container 300 and/or motion thereof during ejection of the container 300 in at least the pitch axis and the yaw axis by retaining the container 300 throughout the ejection event (e.g., as the piston 218 moves from the first stroke position 402 to the second stroke position 504). In some examples, the container retention and release apparatus 200 prevents or restricts motion of the container 300 in the roll axis. For example, the container retention and release apparatus 200 can allow the container 300 to roll approximately 9 degrees (e.g., in either direction about the roll axis) during ejection of the container 300.

Figure 7A:
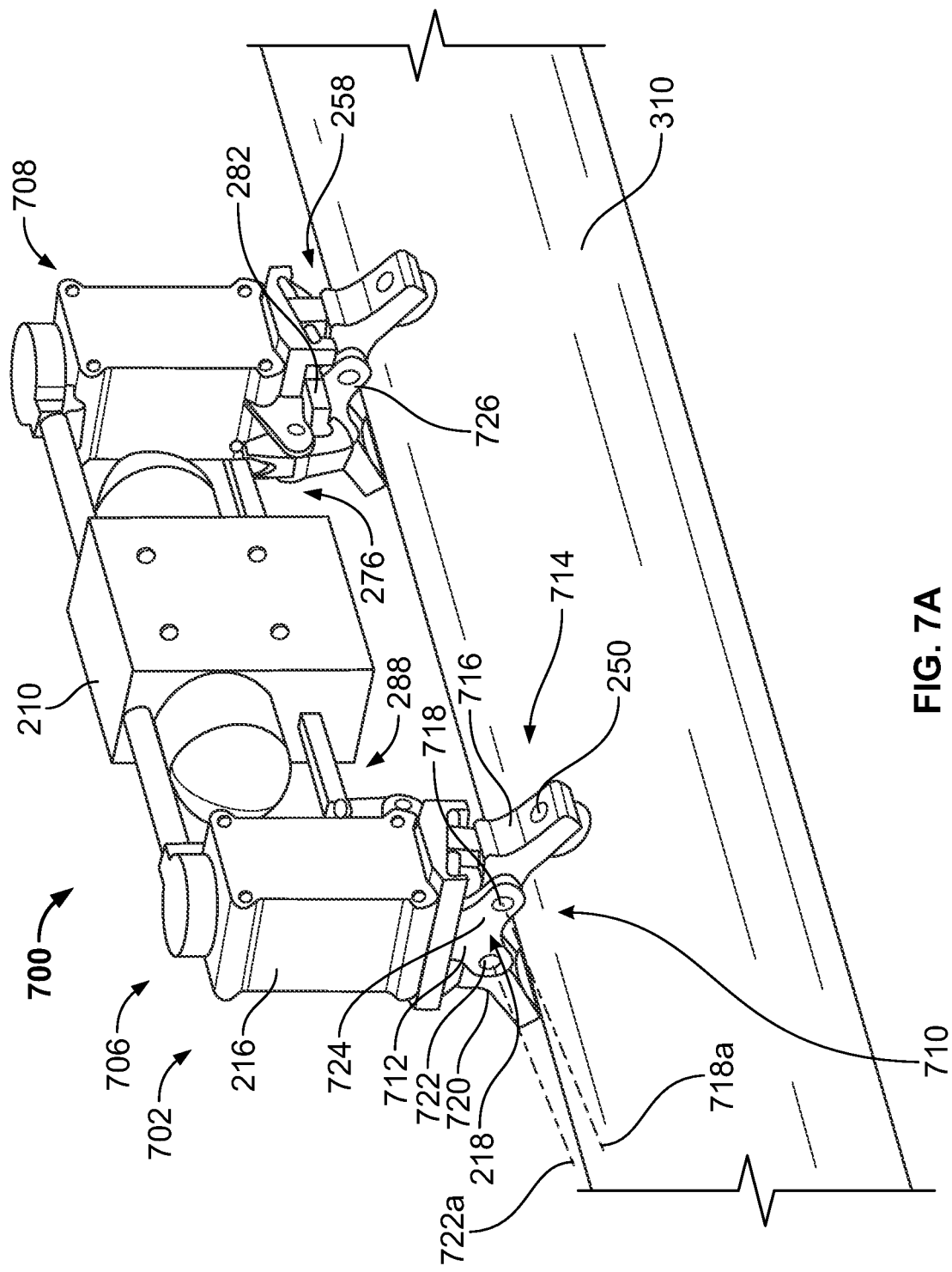
FIG. 7A is a perspective view of another example container retention and release apparatus and container disclosed herein.
Figure 7B:
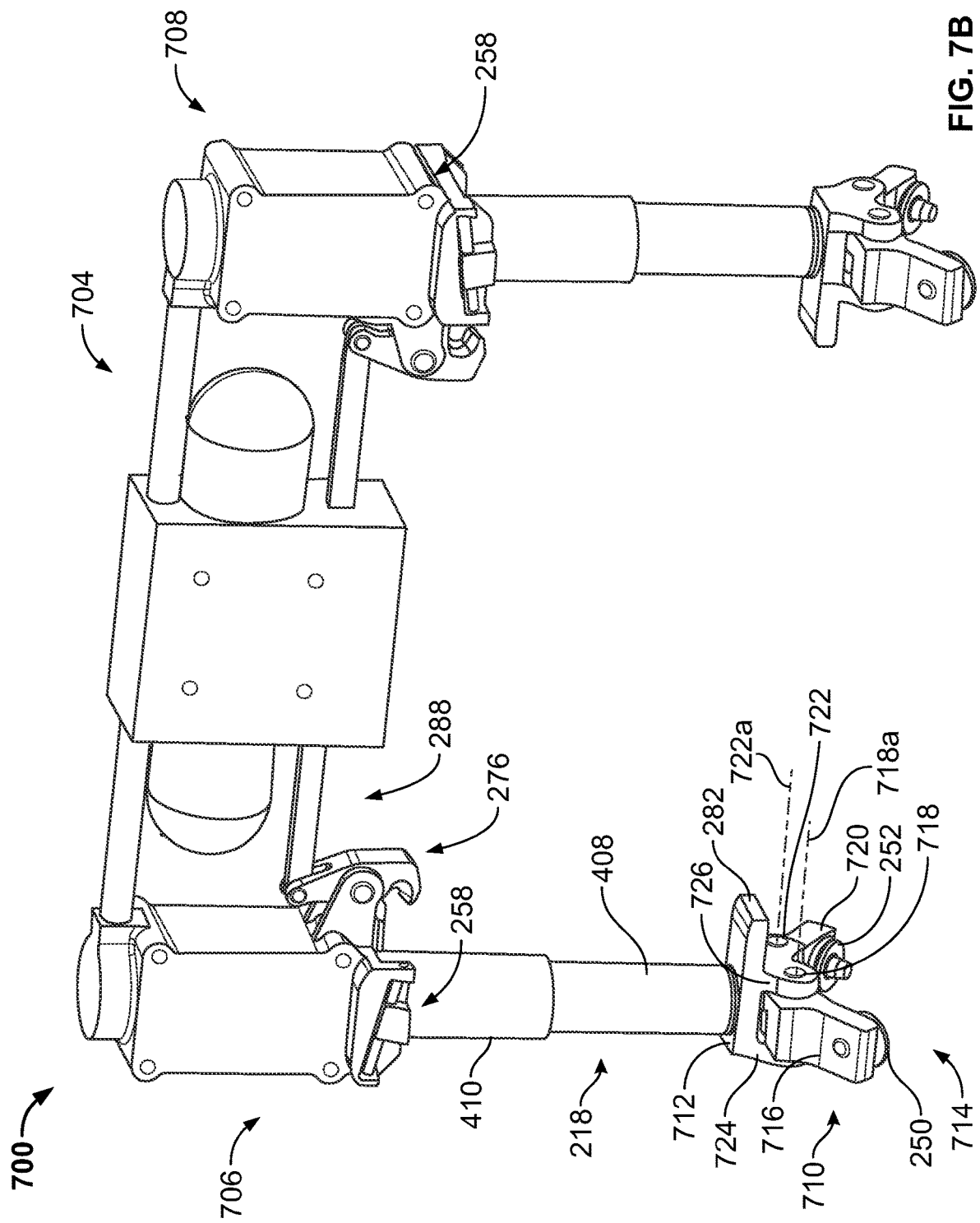
FIG. 7B is a perspective view of the example container retention and release apparatus of FIG. 7A shown in an example deployed position.
Figure 8:
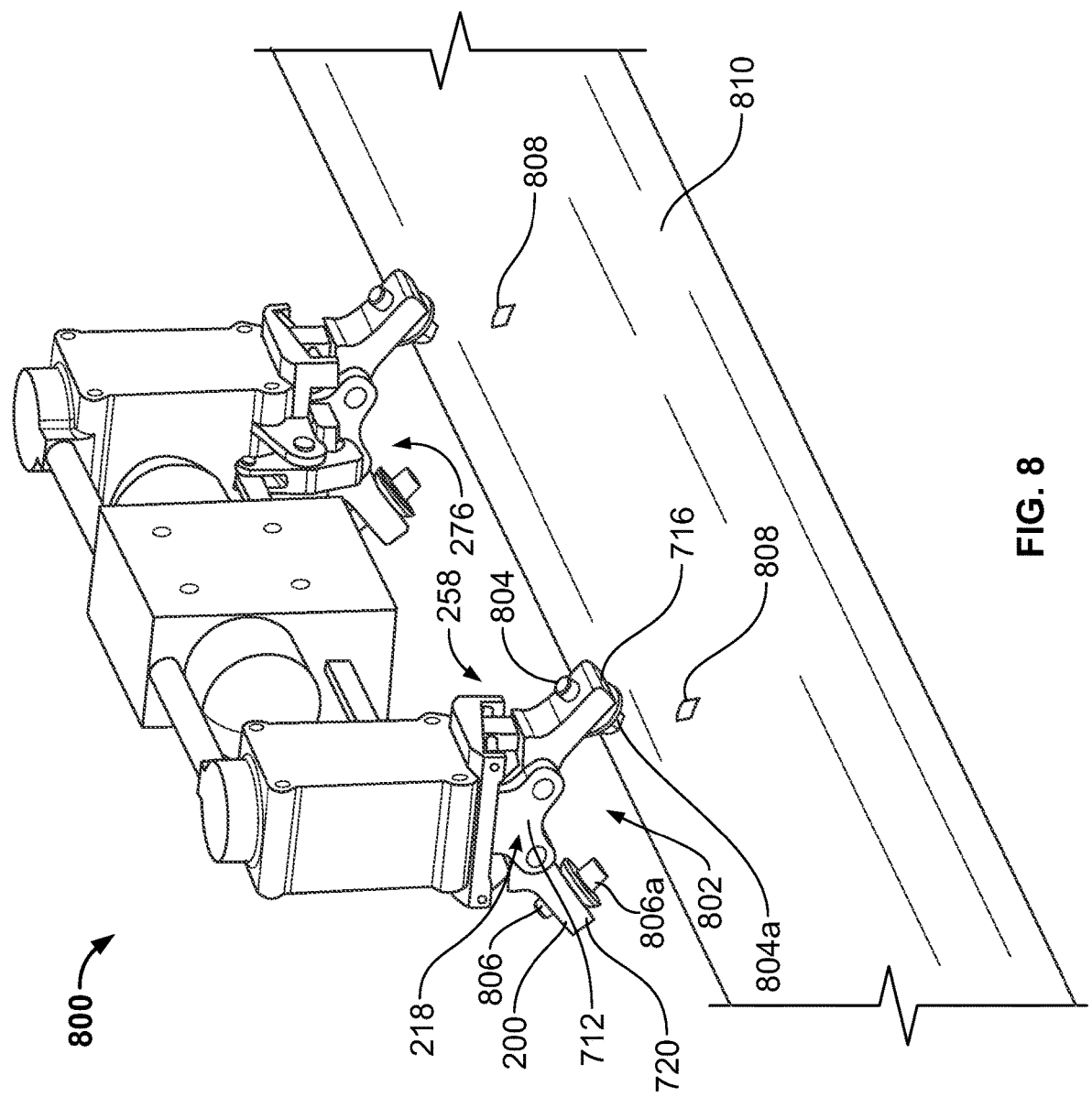
FIG. 8 is a perspective view of another example container retention and release apparatus and container disclosed herein.

FIGS. 7A, 7B and 8 illustrate other example container retention and release apparatus 700 and 800 disclosed herein. For example, the example container retention and release apparatus 700 and 800 can implement a bomb rack of the aircraft 100 of FIG. 1. Those components of the example container retention and release apparatus 700 and 800 of FIGS. 7A, 7B, and 8 that are substantially similar or identical to the components of the container retention and release apparatus 200 described above and that have functions substantially similar or identical to the functions of those components will not be described in detail again below. Instead, the interested reader is referred to the above corresponding descriptions. To facilitate this process, identical reference numbers will be used for like structures.

FIGS. 7A and 7B are perspective views of another example container retention and release apparatus 700 disclosed herein. FIG. 7A illustrates the container retention and release apparatus 700 in a stored position 702. FIG. 7B illustrates the container retention and release apparatus 700 in a deployed position 704. The container retention and release apparatus 700 of the illustrated example includes a first ejector assembly 706, a second ejector assembly 708, and an energy source 210. The first ejector assembly 706 and the second ejector assembly 708 of the illustrated example include a cylinder 216, a piston 218, a lock 258, a latch 276, and a drive system 288.

However, the container retention and release apparatus 700 includes a swaybrace and retention assembly 710 that is different from the swaybrace and retention assembly 214 of the container retention and release apparatus 200. To pivotally couple the swaybrace and retention assembly 710 to the piston 218, the container retention and release apparatus 700 includes a mounting bracket 712. The swaybrace and retention assembly 710 of the illustrated example includes a swaybrace 714 having a first arm 716 pivotally coupled to the mounting bracket 712 about a first pivot 718 and a second arm 720 pivotally coupled to the mounting bracket 712 about a second pivot 722 different than the first pivot 718. To this end, the first arm 716 of the illustrated example pivots about a first pivot axis 718a and the second arm 720 of the illustrated example pivots about a second pivot axis 722a spaced from the first pivot axis 718a. The first arm 716 can pivot independently relative to the second arm 720. The mounting bracket 712 includes a first flange 724 and a second flange 726 to support the first and second pivots 718, 722 and a locking flange 282 that interacts with a latch 276. For example, the first 716 rotates in a counterclockwise direction in the orientation of FIG. 7A when the first arm 716 rotates in the first direction 236 about the pivot 718 and the second arm 720 rotates in a clockwise direction in the orientation of FIG. 7A when the second arm 720 rotates in the first direction 236 about the pivot 722. For example, the first arm 716 rotates in a clockwise direction in the orientation of FIG. 7A when the first arm 716 rotates in the second direction 238 about the pivot 718 and the second arm 720 rotates in a counterclockwise direction in the orientation of FIG. 7A when the second arm 720 rotates in the second direction 238 about the pivot 722.

The example container retention and release apparatus 700 of the illustrated example controls an orientation of the container 300 and/or motion thereof during an ejection event in all three major axes (e.g., the pitch axis, the roll axis and the yaw axis) by physically retaining the container 300 throughout the ejection of the container (e.g., as the piston 218 moves from the first stroke position 402 to the second stroke position 504). The independently pivoting first and second arms 716, 720 eliminate an axis of rotation for the container 300 and, thereby, eliminate a potential for the container 300 to roll during the ejection of the container. Additionally, the first and second arms 716, 720 reduce (e.g., minimize) space requirements for both internally and externally carried weapons. For example, the swaybrace and retention assembly 214 (e.g., the first and second arms 716, 720) reduce space needed for the first and second arms 716, 720 and reduce a height that is needed for the first ejector assembly 706 and the second ejector assembly 708.

FIG. 8 illustrates another example container retention and release apparatus 800 disclosed herein. The container retention and release apparatus 800 of the illustrated example is identical to the container retention and release apparatus 700 of FIGS. 7A and 7B but includes a swaybrace and retention assembly 802 having a first arm 716 and a second arm 720 pivotally coupled to a mounting bracket 712 supported by a piston 218. The swaybrace and retention assembly 802 includes a first retainer 804 and a second retainer 806 that are different than the first and second retainers 250, 252. The first retainers 804 includes a first pin 804a and the second retainer 806 include a second pin 806a. Unlike the first and second pins 250a, 252a, the first and second pins 804a, 806a of the illustrated example have a non-cylindrical shape. For example, the first and second pins 804a, 806a of the illustrated example can have a polygonal shape such as a square shape, a diamond shape, a hex shape, and/or any other non-cylindrical shape. Additionally, openings 808 of a container 810 have a shape that is complementary to the shape (e.g., the non-cylindrical shape) of the first and second pins 804a, 806a. For example, the first and second pins 804a, 806a and the openings 808 of the illustrated example each have a diamond shape. The first and second pins 804a, 806a and the openings 808 of the illustrated example provide an increased bearing area (e.g., a larger surface area) compared to the cylindrically-shaped first and second pins 250a, 252a and the openings 304a-d of FIGS. 2A, 2B, 3, 4A, 4B, 5, 6, 7A and 7B. As a result, the first and second pins 804a, 806a and the openings 808 of the illustrated example increase a load carrying capability to enable the container retention and release apparatus 800 to carry heavier containers (weapons) compared to, for example, the container retention and release apparatus 200 of FIGS. 2A and 2B. For example, a round pin in a round receptacle has lower bearing load capability and also lower shear strength than, for example, a non-cylindrical retention pin in a non-cylindrical opening or receptacle.

Additionally, the polygonal-shaped openings can be less susceptible to radar detection. For example, the openings 808 can be shaped and/or oriented to reflect radar signals transmitted by a radar transmitter away from the radar transmitter to reduce detectability of the container 810 (e.g., a store) by radar. In contrast, a cylindrically-shaped receptacle cannot be tailored to reduce detectability by radar, whereas a non-cylindrically shaped receptacle (e.g., a square, a diamond, a hex, etc.) can be orientated to reduce detectability by radar. The openings 808 may be coated with radar absorbent material to further reduce detectability by radar.

Figure 9:
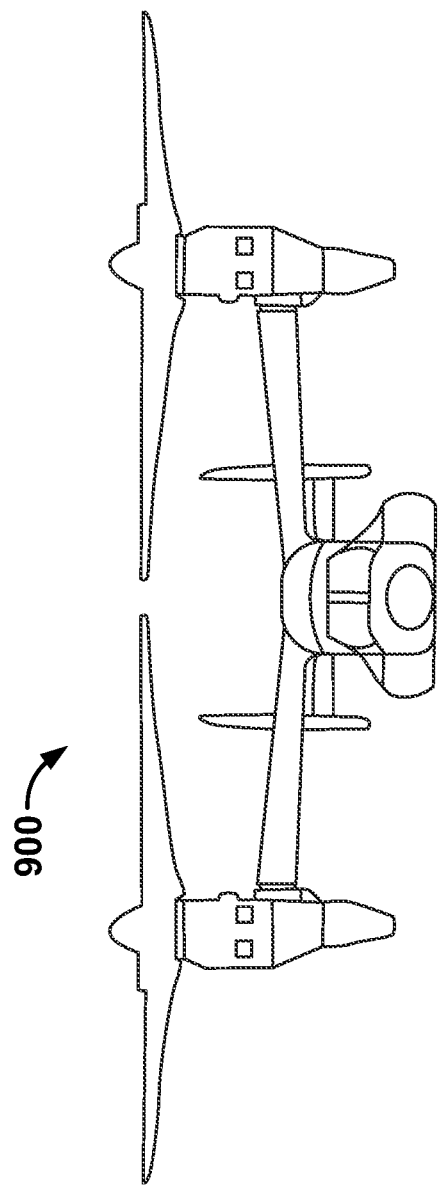
FIG. 9 is a front view of an example commercial aircraft that can be implemented with an example container retention and release apparatus disclosed herein.

FIG. 9 is another aircraft 900 that can be implemented with the example container retention and release apparatus 200, 700, 800 disclosed herein. For example, the aircraft 900 of FIG. 9 is a commercial aircraft that can be used to deliver pods and/or other cargo. In some examples, the aircraft 900 of FIG. 9 can be an autonomous aircraft such as, for example, an unmanned aerial vehicle (i.e., a drone).

Figure 10:
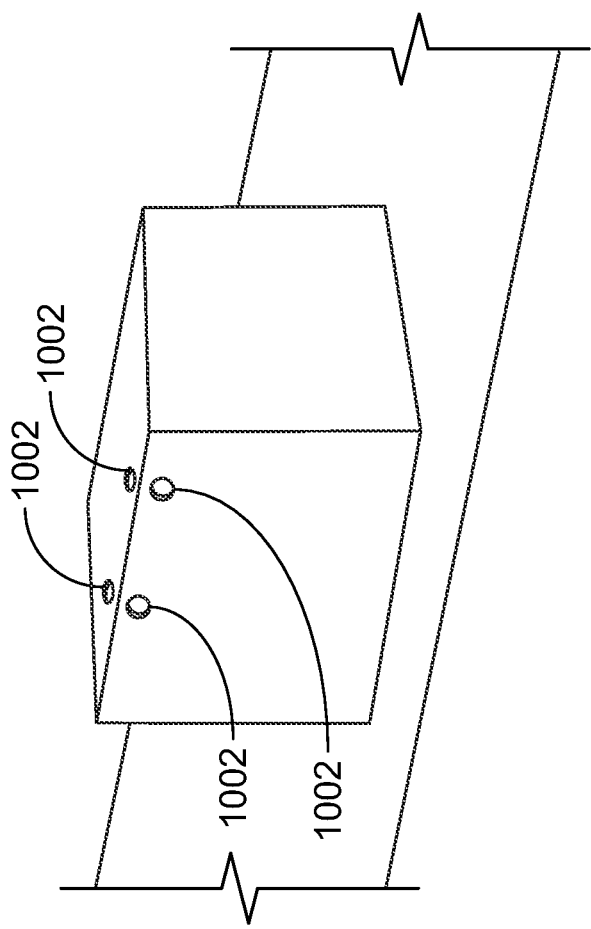
FIG. 10 is a perspective view of another example container for use with an example container retention and release apparatus disclosed herein.

FIG. 10 illustrates another container 1000 that may be carried, retained and/or released by the example container retention and release apparatus 200, 700, 800 disclosed herein. The container 1000 of the illustrated example includes a rectangular (e.g., a square) profile and includes openings 1002 to receive the first and second retainers 250, 252 and/or 804, 806 of the example container retention and release apparatus 200, 700, 800.

Although each example container retention and release apparatus disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

In some examples, the first ejector assembly 206, 706, and/or the second ejector assembly 208, 708 provides means for retaining and/or releasing a container 300, 810, 1000. In some examples, the piston 218 provides means for moving or ejecting a container from an aircraft. In some examples, the swaybrace and retention assembly 214, 710 provides means for clamping or holding a container. In some examples, the pivots 222, 718, 722 (e.g., a fastener and/or equivalents thereof) provide means for pivotably coupling the first arm 232, 716 and the second arm 234, 720 to the first end 218a of the piston 218. In some examples, the cylinder 216 provides means for defining a cavity 404. In some examples, the energy source 210 provides means for providing energy. In some examples, the first pin 250a, 804a and/or the second pin 252a, 806a provide means for engaging or retaining a container. In some examples, the latch 276 provides means for latching the piston 218. In some examples, the drive system 288 provides means for actuating a latch 276 between a latch position 276a and an unlatch position 276b. In some examples, the lock 258 provides means for preventing rotation of the swaybrace and retention assembly 214, 710 (the first arms 232, 716 and the second arms 234, 720) toward the second direction 238 or a release position 600. In some examples, the first wedge 260a and the second wedge 262a provide means for locking the swaybrace and retention assembly 214, 710.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

From the foregoing, it will be appreciated that example methods, apparatus and articles of manufacture improve container aerodynamic drag performance or characteristics by eliminating store lugs, receptacles and/or hangers. As a result, containers can have reduced weight, increased range, and/or increased payload.

At least some of the aforementioned examples include one or more features and/or benefits including, but not limited to, the following:

In some examples, a container retention and release apparatus that includes an actuator a swaybrace and retention assembly pivotally coupled to the actuator. The swaybrace and retention assembly pivot relative to the actuator between a first position to retain a container and a second position to release the container.

In some examples, the swaybrace and retention assembly includes: a swaybrace arm; and a retention pin, the swaybrace arm to pivot between a clamping position to cause the retention pin to engage a receptacle of a container and a release position to cause the retention pin to disengage the receptacle.

In some examples, the actuator includes a cylinder and a piston movably coupled to the cylinder between a first stroke position and a second stroke position, the container retention and release apparatus being in a stored condition when the piston is at the first stroke position and a deployed condition when the piston is at the second stroke position.

In some examples, wherein the swaybrace arm is in the first position to maintain the retention pin in engagement with the container when the piston moves between the first stroke position and the second stroke position.

In some examples, wherein the swaybrace arm moves to the second position to causes the retention pin to disengage the container when the piston is at the second stroke position.

In some examples, further including a latch to prevent movement of the piston when the container retention and release apparatus is in the stored condition.

In some examples, a drive system to move the latch between a latched position to prevent movement of the piston relative to the cylinder and an unlatched position to allow movement of the piston relative to the cylinder.

In some examples, a lock to engage the swaybrace arm when the swaybrace arm is in the first position and the container retention and release apparatus is in the stored condition to prevent pivotal movement of the swaybrace arm in a direction away from the container.

In some examples, a container retention and release apparatus includes a first cylinder assembly including: a first cylinder; a first piston movably coupled to the first cylinder; a first swaybrace coupled to a first end of the first piston, the first swaybrace having a first arm and a second arm, the first arm to be pivotally coupled to the second arm; a first retention pin coupled to the first arm to interface with a first receptacle in a container; and a second retention pin coupled to the second arm to interface with a second receptacle in the container, the second receptacle in the container being spaced from the first receptacle In some examples, the first arm and the second arm are to pivot relative to a pivot axis that is non-parallel to a longitudinal axis of the piston.

In some examples, the first arm and the second arm are to pivot relative to a pivot point.

In some examples, the first arm is to pivot relative to a first pivot point and the second arm is to pivot relative to a second pivot point spaced from the first pivot point.

In some examples, the first arm and the second arm are to pivot in a first direction to enable the first retention pin to engage the first opening and the second retention pin to engage the second opening to retain the container.

In some examples, the first arm and the second arm are to pivot in a second direction opposite the first direction to enable the first retention pin to disengage the first receptacle and the second retention pin to disengage the second receptacle to release the container.

In some examples, a first lock coupled to a first side of the cylinder and a second lock coupled to a second side of the cylinder.

In some examples, the first lock is to engage the first arm to restrict rotation of the first arm in the second direction and the second lock is to engage the second arm to restrict rotation of the second arm in the second direction when the container retention and release apparatus is in a stored condition.

In some examples, the first cylinder assembly includes a first latch movable between a first position to prevent movement of the first piston relative to the first cylinder and a second position to allow movement of the first piston relative to the first cylinder.

In some examples, the container retention and release apparatus includes a second cylinder assembly including: a second cylinder; a second piston movably coupled to the second cylinder; a second swaybrace coupled to a first end of the second piston, the second swaybrace having a third arm and a fourth arm, the third arm to be pivotally coupled to the fourth arm; a third retention pin coupled to the third arm to interface with a third receptacle in the container; and a fourth retention pin coupled to the fourth arm to interface with a fourth receptacle in the container, the fourth receptacle in the container being spaced from the third receptacle, and the third and fourth receptacles being spaced from the first and second receptacles.

In some examples, to improve retention and deployment of a container includes: moving an actuator between a first stroke position and a second stroke position; and releasing the container by pivoting a swaybrace relative to the container to remove a retainer pin from a receptacle of the container.

In some examples, the method includes preventing rectilinear movement of the actuator and pivotal movement of the swaybrace when the container is in a stored position Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A container retention and release apparatus, comprising:
   an actuator including a cylinder and a piston movably coupled to the cylinder, the piston movable relative to the cylinder between a first stroke position in which the piston is retracted relative to the cylinder and a second stroke position in which the piston is extended relative to the cylinder;
   a swaybrace arm pivotally coupled to the piston; and
   a retention pin coupled to the swaybrace arm, the retention pin configured to releasably engage a receptacle of a container, the receptacle extending inwardly from an outer surface of the container, the swaybrace arm configured to pivot relative to the piston between a first position that retains the retention pin in the receptacle of the container when the piston is at the first stroke position and a second position that releases the retention pin from the receptacle of the container when the piston is at the second stroke position.

2. The container retention and release apparatus of claim 1, wherein the container retention and release apparatus is in a stored condition when the piston is at the first stroke position, and the container retention and release apparatus is in a deployed condition when the piston is at the second stroke position.

3. The container retention and release apparatus of claim 2, wherein the swaybrace arm is configured to retain the retention pin in the receptacle of the container as the piston moves from the first stroke position toward the second stroke position.

4. The container retention and release apparatus of claim 2, further including a latch configured to prevent movement of the piston from the first stroke position toward the second stroke position when the container retention and release apparatus is in the stored condition.

5. The container retention and release apparatus of claim 4, further including a drive system configured to move the latch between a latched position that prevents movement of the piston from the first stroke position toward the second stroke position, and an unlatched position that allows movement of the piston from the first stroke position toward the second stroke position.

6. The container retention and release apparatus of claim 2, further including a lock configured to engage the swaybrace arm when the swaybrace arm is in the first position and the container retention and release apparatus is in the stored condition, wherein the engagement of the lock and the swaybrace arm prevents pivotal movement of the swaybrace arm from the first position toward the second position.

7. The container retention and release apparatus of claim 6, wherein the lock includes a wedge slidably coupled to a guide that is supported by the actuator.

8. The container retention and release apparatus of claim 7, wherein the guide is supported by the cylinder.

9. A container retention and release apparatus, comprising:
   an actuator including a cylinder and a piston movably coupled to the cylinder, the piston movable relative to the cylinder between a first stroke position in which the piston is retracted relative to the cylinder and a second stroke position in which the piston is extended relative to the cylinder;
   a first swaybrace arm pivotally coupled to the piston;
   a second swaybrace arm pivotally coupled to the piston;
   a first retention pin coupled to the first swaybrace arm, the first retention pin configured to releasably engage a first receptacle of a container, the first receptacle extending inwardly from an outer surface of the container; and
   a second retention pin coupled to the second swaybrace arm, the second retention pin configured to releasably engage a second receptacle of the container, the second receptacle extending inwardly from the outer surface of the container;
   wherein each one of the first and second swaybrace arms is configured to pivot relative to the piston between a first position that retains a corresponding one of the first and second retention pins in a corresponding one of the first and second receptacles of the container when the piston is at the first stroke position, and a second position that releases the corresponding one of the first and second retention pins from the corresponding one of the first and second receptacles of the container when the piston is at the second stroke position.

10. The container retention and release apparatus of claim 9, wherein the first swaybrace arm and the second swaybrace arm are configured to pivot relative to a pivot axis that is non-parallel to a longitudinal axis of the piston.

11. The apparatus of claim 9, wherein the first swaybrace arm and the second swaybrace arm are configured to pivot relative to a common pivot point.

12. The apparatus of claim 9, wherein the first swaybrace arm is configured to pivot relative to a first pivot point, and the second swaybrace arm is configured to pivot relative to a second pivot point, the second pivot point spaced from the first pivot point.

13. The container retention and release apparatus of claim 9, wherein the container retention and release apparatus is in a stored condition when the piston is at the first stroke position, and the container retention and release apparatus is in a deployed condition when the piston is at the second stroke position.

14. The container retention and release apparatus of claim 13, wherein each one of the first and second swaybrace arms is configured to retain the corresponding one of the first and second retention pins in the corresponding one of the first and second receptacles of the container as the piston moves from the first stroke position toward the second stroke position.

15. The container retention and release apparatus of claim 13, further comprising a latch configured to prevent movement of the piston from the first stroke position toward the second stroke position when the container retention and release apparatus is in the stored condition.

16. The container retention and release apparatus of claim 15, further comprising a drive system configured to move the latch between a latched position that prevents movement of the piston from the first stroke position toward the second stroke position, and an unlatched position that allows movement of the piston from the first stroke position toward the second stroke position.

17. The container retention and release apparatus of claim 13, further comprising:
   a first lock configured to engage the first swaybrace arm when the first swaybrace arm is in the first position and the container retention and release apparatus is in the stored condition, wherein the engagement of the first lock and the first swaybrace arm prevents pivotal movement of the first swaybrace arm from the first position toward the second position; and
   a second lock configured to engage the second swaybrace arm when the second swaybrace arm is in the first position and the container retention and release apparatus is in the stored condition, wherein the engagement of the second lock and the second swaybrace arm prevents pivotal movement of the second swaybrace arm from the first position toward the second position.

18. A container retention and release apparatus, comprising:
- a container having an outer surface and a receptacle, the receptacle extending inwardly from the outer surface;
- an actuator including a cylinder and a piston movably coupled to the cylinder, the piston movable relative to the cylinder between a first stroke position in which the piston is retracted relative to the cylinder and a second stroke position in which the piston is extended relative to the cylinder;
- a swaybrace arm pivotally coupled to the piston; and
- a retention pin coupled to the swaybrace arm, the retention pin configured to releasably engage the receptacle of the container, the swaybrace arm configured to pivot relative to the piston between a first position that retains the retention pin in the receptacle of the container when the piston is at the first stroke position and a second position that releases the retention pin from the receptacle of the container when the piston is at the second stroke position.

19. The container retention and release apparatus of claim 18, wherein the container retention and release apparatus is in a stored condition when the piston is at the first stroke position, and the container retention and release apparatus is in a deployed condition when the piston is at the second stroke position.

20. The container retention and release apparatus of claim 19, wherein the swaybrace arm is configured to retain the retention pin in the receptacle of the container as the piston moves from the first stroke position toward the second stroke position.

* * * * *